United States Patent
Grassi

(10) Patent No.: US 6,394,782 B1
(45) Date of Patent: May 28, 2002

(54) MODULAR APPARATUS FOR COOLING AND VACUUM SIZING AN EXTRUDED PLASTIC PROFILE

(75) Inventor: Walter L. Grassi, Mississauga (CA)

(73) Assignee: Alloy & Cooper International Inc., Mississauga (CA)

(*) Notice: Subject to any disclaimer, the term of this patent is extended or adjusted under 35 U.S.C. 154(b) by 0 days.

(21) Appl. No.: 09/429,707

(22) Filed: Oct. 29, 1999

(51) Int. Cl.$^7$ ................................................ B29C 55/00
(52) U.S. Cl. ...................... 425/384; 425/388; 425/326.1
(58) Field of Search ........................... 425/71, 186, 190, 425/192 R, 326.1, 384, 388

(56) References Cited

U.S. PATENT DOCUMENTS

| | | | |
|---|---|---|---|
| 4,181,487 A | * 1/1980 | Kessler | 425/326.1 |
| 4,401,424 A | * 8/1983 | De Zen | 425/388 |
| 5,238,376 A | * 8/1993 | Figuereo | 425/97 |
| 5,288,218 A | 2/1994 | Melkonian | |
| 5,316,459 A | 5/1994 | Melkonian et al. | |
| 5,480,295 A | 1/1996 | Greve | |
| 5,514,325 A | 5/1996 | Pürstlinger | |
| 5,607,638 A | 3/1997 | Cadwell | |
| 5,780,071 A | 7/1998 | Racioppi et al. | |
| 6,200,119 B1 | * 3/2001 | Pelto et al. | 425/71 |

FOREIGN PATENT DOCUMENTS

CA 1154218 9/1983

* cited by examiner

Primary Examiner—Nam Nguyen
Assistant Examiner—Donald Heckenberg
(74) Attorney, Agent, or Firm—Marks & Clerk

(57) ABSTRACT

A modular apparatus for cooling and sizing extruded plastic profiles includes a base plate and a first side plate which are permanently connected together and perpendicular to each other so as form a pair of reference planes. One or two groups of vacuum sizer die elements having a passageway through which an extruded plastic profile will be advanced forwardly in a longitudinal direction from an extrusion die, are placed onto the reference planes. Each of the vacuum sizer die elements has reference surfaces which mate to the reference planes; and the group or groups of vacuum sizer die elements are secured in place in the apparatus with one or two further side plates and a top plate. Vacuum is provided to the vacuum sizer die elements through vacuum connections arranged in the base plate, and cooling is provided in a cooling water passageway formed generally in the side plate. The vacuum sizer die elements may be removed and replaced with other vacuum sizer die elements having another passageway with a different profile, without having to realign the vacuum sizer dies, due to the presence of the reference planes and co-operating reference sides.

21 Claims, 5 Drawing Sheets

MODULAR APPARATUS FOR COOLING AND VACUUM SIZING AN EXTRUDED PLASTIC PROFILE

FIELD OF THE INVENTION

This invention relates to vacuum sizers for extruded plastic profiles, and more particularly the present invention relates to modular vacuum sizing devices which are such that differing vacuum sizer dies can be assembled and disassembled into a vacuum sizer box without the necessity to realign the dies.

BACKGROUND OF THE INVENTION

The art of extruding complicated profiles and shapes of an extrudable thermoplastic material, for subsequent use in many different manners, is well known. For example, many different forms of extruded plastic are used as parts, body trim, and so on, on automobiles. Other extruded plastics materials are used for such purposes as picture framing and the like. Still other examples for the use of extruded plastic materials include trim around bathtubs, door openings, door edges of cabinet doors used in bathrooms and kitchens, and so on.

However, there are several fields in which highly complicated extruded plastics profiles are used, where the size or calibration of each profile is critical. One field, in particular, where such criteria exist is the field of windows and doors which are made for domestic, industrial, and commercial purposes, where the frame of the window or door into which window glass or a door panel is placed, or the outer frame which is placed in a suitable wall opening, are formed in extruded plastic. Because different profiles fit to one another, or must have specific dimensions so as to accommodate the placement of glass panels, for example, or may sometimes be formed as a co-extrusion of a hard plastics material with a soft plastics material which may be intended to be used as a sealer or gasket, the ability to produce the plastic extrusions with defined dimensions having very small tolerances, is critical.

Accordingly, a body of art has been developed in respect of vacuum sizing boxes—sometimes referred to as vacuum calibrators—through which the extruded plastic profile is passed, and in which the size or dimensions of the extruded plastic profile are carefully controlled by the use of vacuum to pull the plastic material to the outer edges of a specifically shaped passageway as the extruded profile is passed therethrough. However, the construction of vacuum sizer boxes is very expensive. Each box requires a base plate, a top plate, and side plates, together with appropriate connections to cooling water and vacuum pumps so as to cool and size the extrusion as it passes through the vacuum sizer box. Heretofore, it has been necessary to build a different and complete vacuum sizer box for each different profile which is to be extruded. Changing vacuum sizer boxes to accommodate a different profile has required considerable down time of the extrusion line.

Still further, it sometimes happens that the extrusion line must be stopped for one reason or another and, if so, it may be necessary to disassemble the vacuum sizer box, take out the sizing dies and clean them, and then reassemble the vacuum sizer box. Heretofore, that has meant that the vacuum sizer dies in the vacuum sizer box must be realigned, which is a lengthy, time-consuming process, resulting in still further down time for the extrusion line.

As an example, every time an ordinary vacuum sizer box is required to be disassembled, vacuum lines and water hoses must be disconnected and, of course, the alignment of the passageways of individual dies which are bolted together inside the vacuum sizer block is lost. One approach that has been taken in the past to avoid the requirement for realignment has been to create sizing dies which have longer lengths. That, in turn, has significantly increased the cost of production of such dies.

On the other hand, the present invention significantly decreases the cost of production of vacuum sizing boxes, and it significantly decreases the down time of an extrusion line either for changing vacuum sizing boxes to accommodate a different profile, or to clean the dies. These advantages are achieved primarily by the provision of a pre-assembled base plate and side plate for a vacuum sizing box, which provide reference planes arranged perpendicularly one to the other. Then, a plurality of vacuum sizer die elements is provided, each of which is rectangular (or square) and each of which has two reference surfaces—one at the bottom and the other at one side—which fit against the reference planes provided by the bottom plate and side plate. The vacuum sizing profile is carefully and precisely machined into each vacuum sizer die element, with particular emphasis on the placement of the profile with respect to the reference surfaces which have been machined on two sides of the die to fit against the reference planes. Thus, assembly or reassembly of the vacuum sizer box is easily accommodated without the necessity for realignment of the die elements.

Moreover, the present invention provides that the vacuum lines and water lines may be permanently connected to the vacuum sizer box, by connecting vacuum lines to the base plate and providing appropriate holes and slots in the base plate and one or more of the die elements—as described hereafter.

Also, removable side plates can be fitted with water passageways, so there is no necessity for connecting, disconnecting, and/or reconnecting of water lines.

Thus, in keeping with the present invention, it is merely necessary to place a new group or groups of vacuum sizer die elements against the reference planes which are fitted permanently in place in the extrusion line, and then reassemble the other side plate or plates, and top plate of the vacuum sizer box, all of which can be done quite quickly and without the necessity to realign the die elements.

In the usual practice of the present invention, as discussed in greater detail hereafter, the individual vacuum sizer die elements are cut into two sections, an upper section and a lower section, which makes assembly and cleaning much easier and quicker. Moreover, testing and proving the vacuum sizer die elements may be made easier, especially if it may develop that there is a necessity to provide for an additional or further vacuum domain in any particular region of the profile. As will become evident hereafter, the placement and/or relocation of vacuum passages in vacuum sizer die elements in keeping with the present invention, is simplified over that which has gone before.

DESCRIPTION OF THE PRIOR ART

DeZEN Canadian Patent No. 1,154,218 teaches a vacuum sizing device which includes a plurality of pairs of upper and lower sizing elements that are clamped between upper and lower backing members. However, all of the lower elements are identical to one another, and all of the upper elements are identical to one another; and each of the upper and lower elements is such that it has uniform cross-sectional shape throughout its length. Each individual element is individually attached to both a source of vacuum and a source of cooling fluid, and contains a vacuum chamber and a cooling fluid chamber. Assembly and disassembly of the vacuum sizing device requires connection, disconnection, and/or re-connection, of a plurality of vacuum and cooling fluid conduits.

MELKONIAN U.S. Pat. No. 5,288,218 teaches an extrusion calibrating apparatus which is connectable to external sources of cooling and vacuums, and which is for use in the calibration of exterior profiles of hollow thermal plastic extrusions. The assembly of the extrusion calibrating apparatus includes upper and lower cover plates, each having a pair of vacuum manifolds, together with upper and lower vacuum plates each having vacuum slots and supply and return water channels, and a heat conducting calibrating insert which is removably positioned within an interior chamber between the vacuum plates. The removable heat conducting calibrating insert is designed to pass through an access opening formed when an upper cover plate and the upper vacuum plate are rotated into the open position. The insert has a forward face and rearward face, with the calibrating aperture corresponding to the exterior profile of the extrusion extending lengthwise through the insert between its forward and rearward faces. An "O"-ring seal is used to provide a seal between the front and rear cover plates and the insert forward and rearward faces, so as to prevent cooling water from passing therebetween and entering the calibrating aperture. The external water and vacuum sources are permanently connected to the calibrator box, while the calibrator insert may be removed. The lower cover plate remains fixedly attached to a stationary base or support, and thus the calibrator box remains aligned with the extrusion die. The only element which requires to be machined is the calibrating insert. However, it is but a single calibrating insert, requiring specific sealing in the box, and requiring vacuum manifolds, all of which increase the cost and may increase down time in the event of the necessity to clean the calibrator die.

A further United States patent to MELKONIAN et al., being U.S. Pat. No. 5,316,459, teaches a similar extrusion calibrating apparatus to that described above. The calibrating aperture has a forward opening in the forward face to allow the entry of the extrusion into the forward opening, and insert slots are positioned to intercept with the calibrating aperture so as to communicate a vacuum to the thin wall of the extrusion as it passes through the calibrating aperture.

PÜRTSLINGER U.S. Pat. No. 5,514,325 teaches an apparatus and process for cooling and, if necessary, calibrating elongated continuously extruded objects made of plastic. The housing interior is divided by support diaphragms into a plurality of consecutive regions. The extrusion passes into the housing and through the consecutive support diaphragms, and the object is discharged at the outlet region. A cooling liquid is circulated throughout the consecutive regions, and a calibrating device may be used to guide and stabilize the cross-sectional shape of the objects passing through the housing.

CADWELL U.S. Pat. No. 5,607,638 teaches a vacuum sizing apparatus and method of cooling and sizing plastic extrusions. Extrudate from the extrusion die enters the vacuum sizing chamber through an entry sizing plate manifold. This maintains or imparts the size and shape of the extrudate as it enters the vacuum chamber. The entry sizing plate manifold may be of substantially reduced thickness relative to the initial sizing tool typically used in water or vacuum sizing tanks. The vacuum pressure applied to the entry and exit sizing plate manifolds acts as a seal to reduce water leakage from the vacuum chamber.

U.S. Pat. No. 5,780,071 to RACIOPPI et al. teaches a series of pre-aligned calibrators on a base, where the first section of calibrators is connected to the base and a second set of calibrators is connected to the table. This arrangement is so as to allow for thermal expansion of the base. A particular method for alignment of the calibrators is taught, but it is noted that the calibrators must be aligned. The calibrators themselves are provided with internal manifolds and vacuum ports, as well as an internal passage for a liquid coolant. The calibrators collectively define a linear extrusion pathway that limits damage to the surface finish, avoids internal strains, and otherwise is said to preclude unwanted results. The calibrators are mounted on a base so as to pre-align the extrudate pathway before the calibrators are installed on the extrusion line, and the emphasis of the patent is to the pre-alignment of the calibration devices on the base platform.

SUMMARY OF THE INVENTION

In accordance with one aspect of the present invention, there is provided an apparatus for cooling and sizing an extruded plastic profile as the extruded plastic profile is advanced forwardly in a longitudinal direction from an extrusion die. The apparatus of the present invention is modular in nature.

The apparatus of the present invention is connected to a source of cooling water, and includes at least one water passage through which cooling water or other cooling fluid will flow. The apparatus is connected to at least one vacuum pump, and includes vacuum passages and vacuum chambers within the apparatus, so that vacuum domains may be set up within the apparatus.

The apparatus comprises a base plate, a first side plate, at least one second side plate, a top plate, and a plurality of vacuum sizer die elements. Each of the plurality of vacuum sizer die elements has a passageway therethrough, which is in the shape of an extruded plastic profile to be cooled and sized by being advanced in a longitudinal direction through the apparatus. The plurality of vacuum sizer die elements are arranged sequentially in at least one group with the first die element in any group of die elements being that which is closest to the end of the apparatus which faces an extrusion die when the apparatus is in its operative position. The respective passageways of the contiguous die elements are aligned one with another.

At least one water passage is formed in at least one of the base plate, the first side plate, the at least one second side plate, and the top plate. Typically, as discussed hereafter, the at least one water passage is provided in the at least one second side plate, but it might also be provided in the top plate.

At least one vacuum chamber is formed in at least one face of at least one vacuum sizer die element in the at least one group of die elements. That at least one face contacts another face of a contiguous vacuum sizer die element in the same group. There is at least one vacuum slot which extends from the at least one vacuum chamber to the outer periphery of the passageway, so as to provide vacuum communication from the passageway to the vacuum chamber.

The at least one vacuum chamber is in vacuum communication through a respective passage formed in the base plate, with the at least one vacuum pump.

The present invention provides that the base plate and the first side plate are permanently connected one to the other so as to provide a pair of reference planes defined thereby, the reference planes being perpendicular to each other. Each of the vacuum sizer die elements is formed with two faces which are perpendicular to the longitudinal direction, and each vacuum sizer die element has four sides forming a rectangular periphery. Two of the four sides of each of the vacuum sizer die elements, which two sides are perpendicular to each other, are precisely machined so as to be reference sides of each respective die element, and those reference sides of each of the plurality of the vacuum sizer die elements fits to the reference planes defined by the base plate and the first side plate. The passageway formed in each of the plurality of vacuum sizer die elements is placed with precise relationship to the respective reference sides of each respective vacuum sizer die element.

The outer dimensions of the respective passageways of the contiguous die elements may be reduced from the first die element in any group of die elements to the last die element in that group of die elements.

Moreover, the dimensions of the passageways of at least more than one of the plurality of vacuum sizer die elements in any group of die elements may be progressively diminished from one face to the other of each of the respective vacuum sizer die elements.

Typically, each of the plurality of vacuum sizer die elements is split into upper and lower sections. When the upper and lower sections of each of the plurality of vacuum sizer die elements are assembled together, they thereby define the passageway through which the extruded plastic profile will pass and be sized or calibrated.

A typical arrangement, in keeping with the present invention, provides for two groups of vacuum sizer die elements assembled in the apparatus. In such assembly, there are two second side plates, one for each of the two groups of vacuum sizer die elements.

Moreover, in an assembly such as that described immediately above, typically there is at least one water passage formed in each of the two second side plates.

The water passage which may be formed in each of the second side plates may be in the form of a groove which is cut into the outer surface of each of the second side plates, together with a cover plate which is placed against the respective outer surface of each of the second side plates, and connected thereto, so as to define the water passage in the groove and confined by the cover plate.

When there are two groups of vacuum sizer die elements assembled into the apparatus of the present invention, the first side plate may be provided having an opening formed therein, and the two groups of vacuum sizer die elements are placed in the apparatus so as to be positioned with one group on each side of the opening.

Each group of vacuum sizer die elements, when assembled, is clamped together. The vacuum sizer elements may be clamped together by a plurality of bolts passed through a plurality of respective bolt holes formed in each of the vacuum sizer die elements. They may also be clamped together by being placed between a pair of setting blocks which are secured to at least one of the base plate and the first side plate, where at least one set screw extends through one of the setting blocks so as to be advanced against the endmost vacuum sizer die element, and thus so as to urge the group of vacuum sizer die elements into a clamped together relationship.

There may be a plurality of vacuum pumps in vacuum communication with a plurality of vacuum chambers. Thus, the vacuum pressure existing in the respective vacuum domains throughout the apparatus, as defined by the respective vacuum chambers with which they are in vacuum communication, may be varied from one vacuum domain to another.

In a particular embodiment of the present invention, at least one vacuum chamber is formed in each respective vacuum sizer die element in each group. In another embodiment, vacuum domains of at least two vacuum sizer die elements are in vacuum communication with a single vacuum chamber.

When the apparatus of the present invention is assembled, typically there is a tongue and groove fitment between the baseplate and the at least one second side plate; and also between the top plate and each of the first side plate and the at least one second side plate.

In general, each of the base plate, first side plate, at least one second side plate, top plate, and the plurality of vacuum sizer die elements, is machined from aluminum.

Where there are two groups of vacuum sizer die elements arranged in the apparatus, especially in the circumstance where they are positioned at each side of the opening formed in the first side plate, a thermal break exists in the region of the opening in the first side plate.

A provision of the present invention is that differing groups of vacuum sizer die elements, having different passageways in the shape of different respective extruded plastic profiles, may be placed into the apparatus by fitment of the respective reference sides of each of the respective group of vacuum sizer die elements to the reference planes. Subsequently, the top plate and the at least one second side plate are assembled so as to place the apparatus of the present invention in operative condition.

In one embodiment of the present invention, a plurality of vacuum passages extend through each one of the vacuum sizer die elements, and at least on slit extends from each of the vacuum passages to the outer periphery of the passageway. This arrangement provides vacuum communication from the passageway to the plurality of vacuum passages.

In another embodiment of the present invention, there is a vacuum slot formed in at least one face of at least one vacuum sizer die element in the at least one group thereof; and this arrangement provides vacuum communication from the passageway to the at least one vacuum chamber formed in the at least one face.

Thus, an object of the present invention is to provide a modular apparatus comprising a plurality of vacuum sizer die elements, which may be changed with a minimum of effort and in a minimum amount of time.

Still further, the present invention provides for an apparatus for cooling and sizing an extruded plastic profile, where the cost of production of the apparatus may be reduced, resulting in savings of production costs for the extruded plastic profile as it is manufactured.

Yet another object of the present invention is to provide for a vacuum sizer box whose assembly and disassembly do not require connecting and disconnecting either vacuum or cooling water lines which are connected thereto.

These and other objects and features of the present invention are described in greater detail hereafter.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which.

DETAILED DESCRIPTION OF THE PREFERRED EMBODIMENTS

Figure 1:
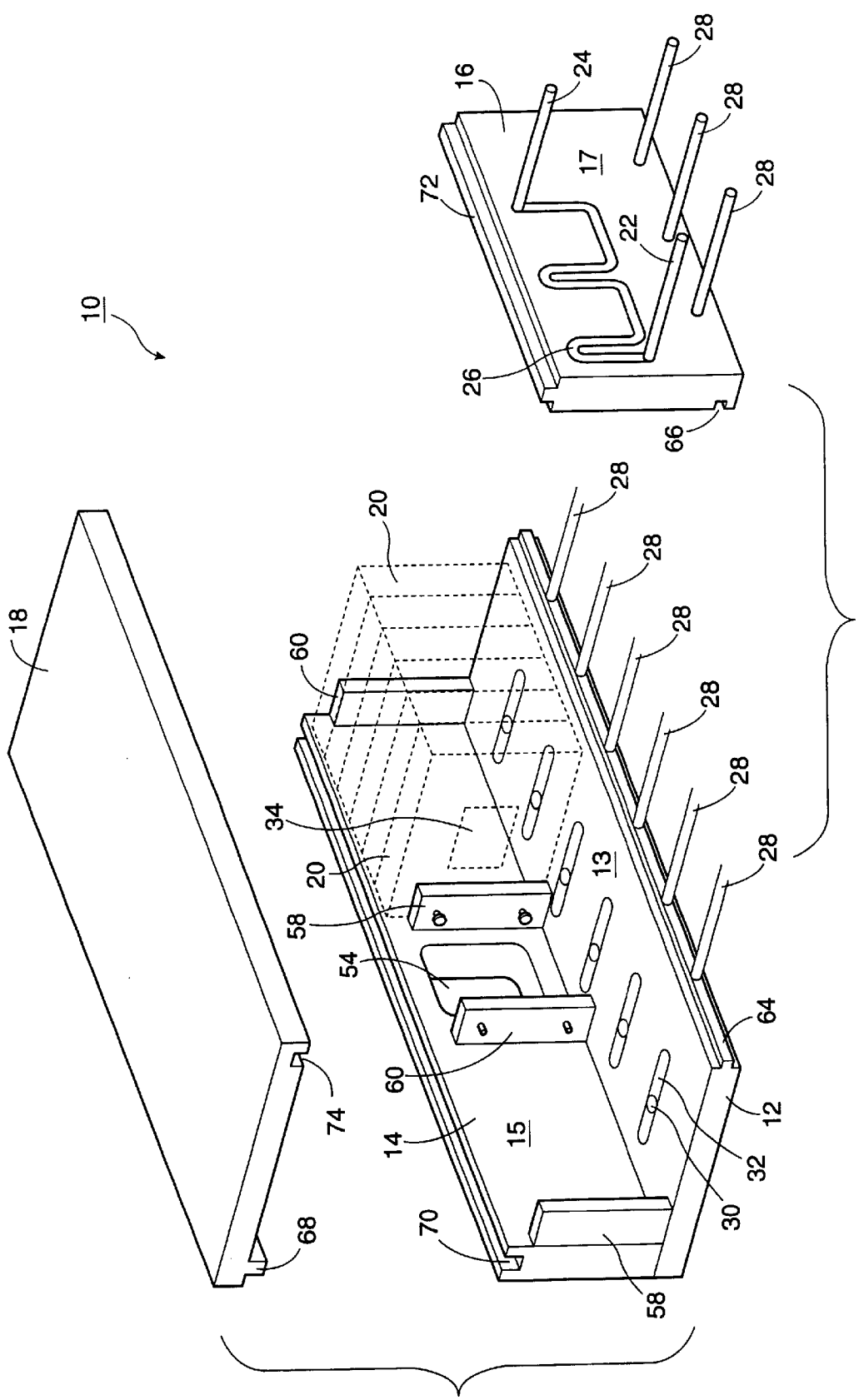
FIG. 1 is an exploded perspective view of an apparatus in keeping with the present invention, showing a group of vacuum sizer die elements in ghost outline.

Turning first to FIG. 1, a disassembled vacuum sizer box in keeping with the present invention is shown at 10. The vacuum sizer box 10, when in use, is placed on a support or stand (not shown) in a position in front of the exit die of an extrusion machine (not shown). An extruded profile exiting from the extrusion machine is passed through the vacuum sizer, where it is cooled and sized or calibrated. Very often, after the extruded profile has been calibrated in the vacuum sizer box 10, it is passed through a further cooling bath (not shown) in a manner which is well known in the art.

As is well known, the purpose of the vacuum sizer box or calibrator box is to ensure that the complicated profile of the extruded plastic piece maintains critical dimensions. Those dimensions are, for the most part, exterior dimensions of the profile, and the dimensions are critical because they will co-act with other extruded profiles or other manufactured structural elements in the door or window, door frame or window frame, or other article to be manufactured or assembled. However, the extruded profile must also be such that it is rugged and weather resistant and, as such, the extruded profile is generally made from various grades and qualities of vinyl. Indeed, as will be noted hereafter, the profile may have a co-extrusion of a soft vinyl or other material with it, but it is otherwise a rigid extruded element after it has been cooled and cut to length.

In order for the extruded element to be properly sized in a vacuum sizer box, the extruded element is formed having relatively thin walls—typically, one or two millimetres thick. When such walls are first extruded, they are quite soft, and they must be cooled quite quickly in order to acquire sufficient rigidity that they can be handled through a further cooling bath and then manually handled, cut, stacked, shipped, and so on. In the first 50 centimetres to 100 centimetres, or so, after the extruded profile has left the extruded machine, its handling is critical; and it is at that time that it passes through a vacuum sizer box which is thus an apparatus for cooling and sizing an extruded plastic profile as that extruded plastic profile is advanced forwardly in a longitudinal direction from the extrusion die.

As the extruded vinyl (or other plastics material) cools, it tends to shrink; however, the amount which it shrinks must be controlled. For that reason, the size of the passageway in the various vacuum sizer die elements through which the extruded profile passes will vary, as discussed hereafter. However, the amount of shrinkage is controlled by, in essence, pulling the thick walls of the extruded profile outwardly towards the external walls which define the passageway through the vacuum sizer die elements, by creating a vacuum domain in the region at the outer surfaces of the extruded profile. Generally, the vacuum domains are created in selected regions, so as to ensure that specific critical dimensions, in particular, are maintained.

However, as discussed hereafter, and as noted above, it is a particular feature of the present invention that, once the vacuum sizer die elements have been cut and proven, they may be assembled and disassembled without the necessity for re-alignment. Conditions may sometimes exist where it may be necessary to disassemble and then reassemble a vacuum sizer box—for example, in the event of a faulty post-cooling tank, or in the event that a cutter blade needs to be replaced, or even in the event of a power outage. In such events, the profile no longer moves through the vacuum sizer box, and may cool to such an extent that it becomes sticky inside the vacuum sizer box, necessitating its disassembly so as to remove material from the vacuum sizer box and to clean the passageways through which it has moved. Heretofore, that has meant the necessity for re-aligning the cavity elements or die elements, as well as extensive disassembly of the vacuum box itself with the concomitant disconnection and re-connection of vacuum and cooling water (or other coolant) lines. The present invention obviates those time-consuming requirements, as now described.

A typical vacuum sizer box, in keeping with the present invention, comprises a base plate 12, a first side plate 14, at least one second side plate 16, a top plate 18, and a plurality of vacuum sizer die elements 20, shown in ghost outline in FIG. 1, and shown elsewhere throughout the drawings.

Figure 3:
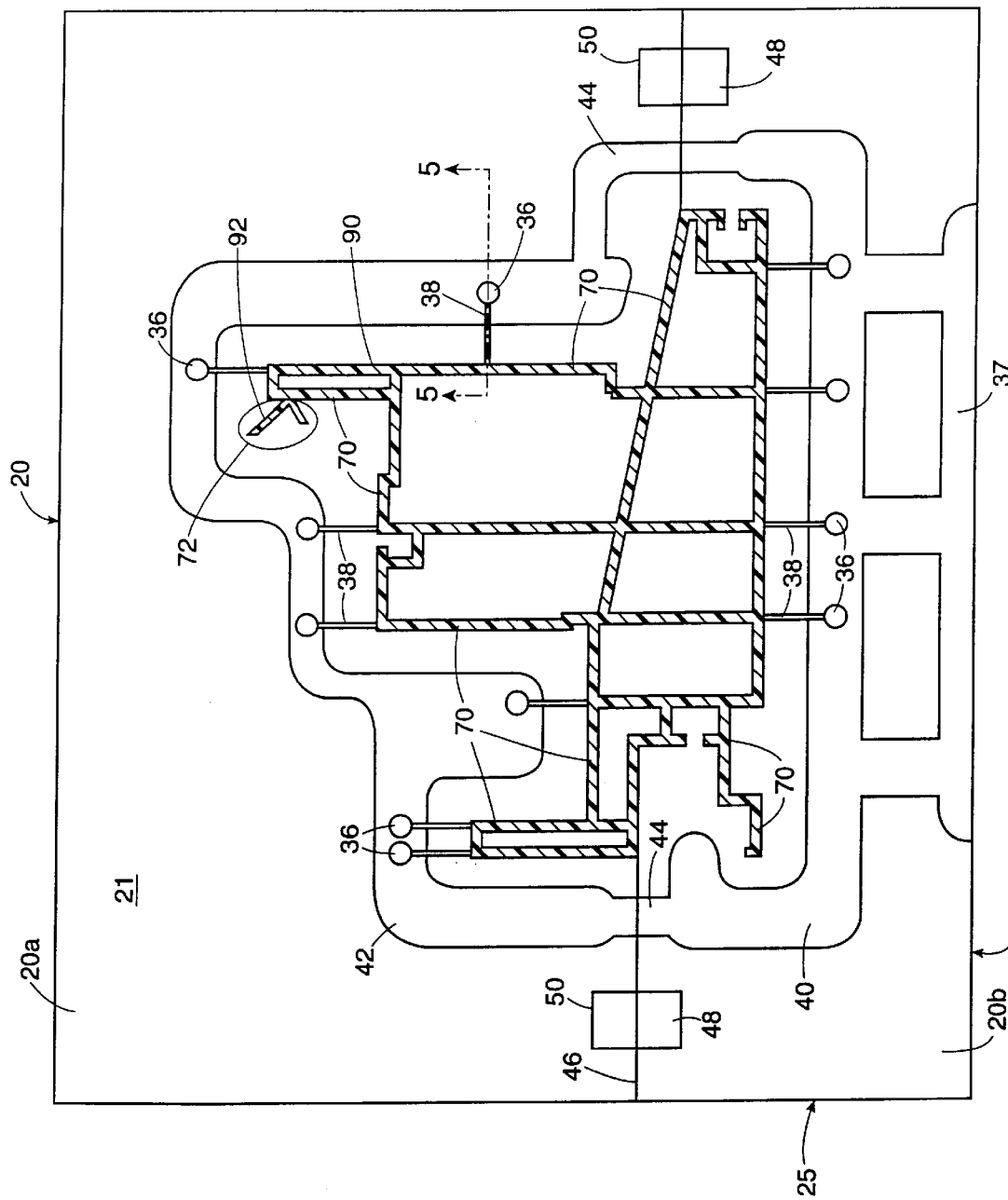
FIG. 3 shows the front face of a typical vacuum sizer die element in keeping with the present invention, with a typical complicated extrusion profile in place within the die element.
Figure 6:
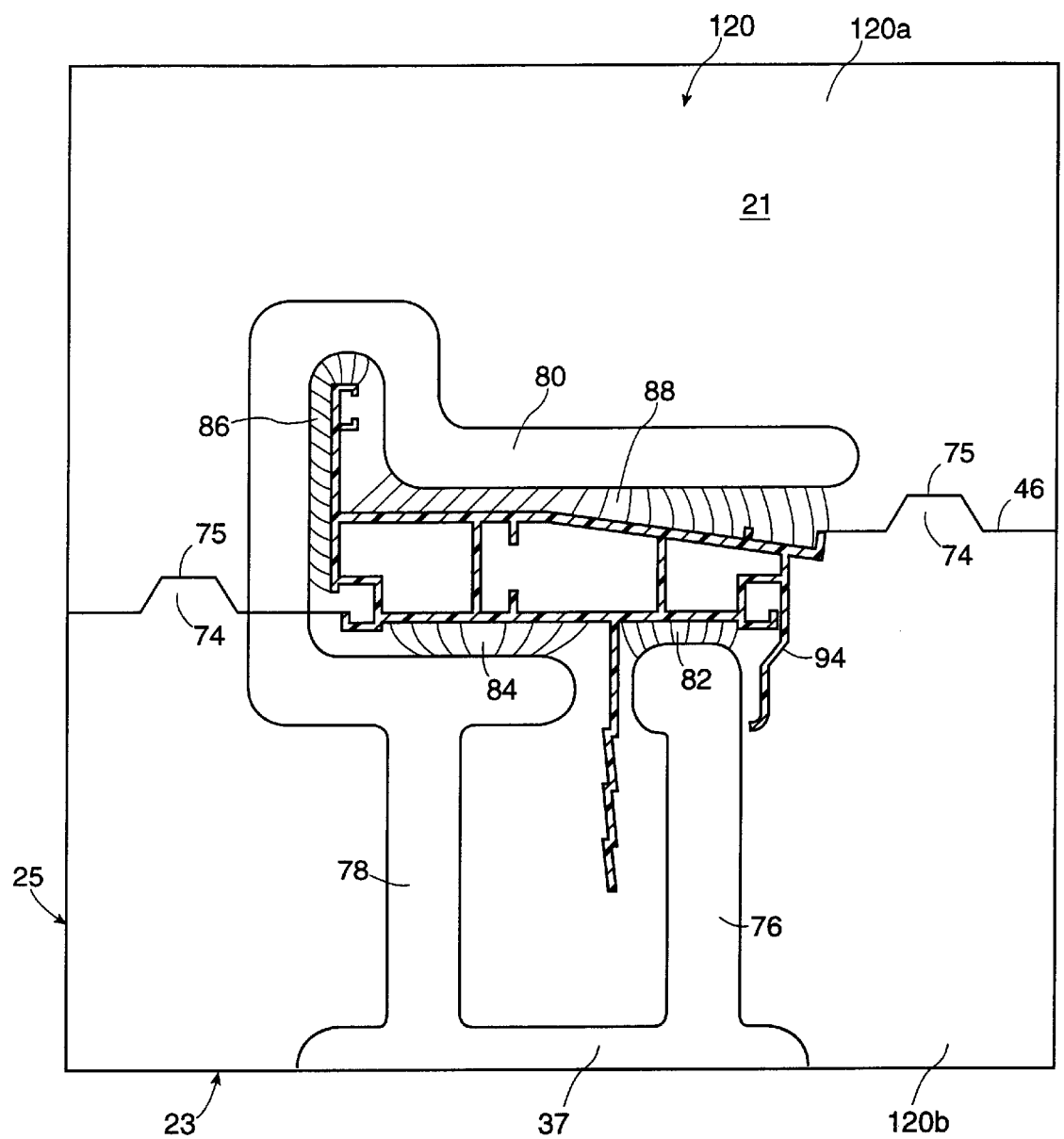
FIG. 6 shows the front face of an alternative embodiment of vacuum sizer die element in keeping with the present invention, also having a typical complicated extrusion profile in place within the die element.

It is important to note, as will be evident from an inspection of FIG. 6, that reference throughout the following discussion to a vacuum sizer die element 20 will also be understood to be reference to a vacuum sizer die element 120. It will be further understood, of course, that reference to groups of vacuum sizer die elements 20 will also be understood to include reference to groups of vacuum sizer die elements 120. It will be clear from the following discussion, and from an inspection of FIGS. 3 and 6, that the specific differences between vacuum sizer die elements 20 and 120 is the manner in which the vacuum chambers are disposed in the faces of the elements, and the manner in which the vacuum acts on the outer surfaces of the extruded profile as the profile passes through the respective vacuum sizer die elements. Different extrusion profiles are shown in FIGS. 3 and 6, for matters of convenience, but it will be clearly understood that the nature of the extrusion profile for which any vacuum sizer die element in keeping with the present invention has been prepared, is immaterial to the present invention.

The vacuum sizer box 10, when in its operative and assembled condition, is connected to a source of cooling water (not shown) or other coolant, through inlet and outlet conduits such as those shown at 22 and 24. At least one water passage 26, through which the cooling water will flow, is found in the vacuum sizer box 10. However, the placement and details of a typical at least one water passage 26 are described hereafter.

The vacuum sizer box 10 is connected to at least one vacuum pump (not shown) through such as vacuum lines 28.

The vacuum lines 28 connect through passages (not shown) which are formed in the base plate 12, but they may conveniently terminate at an exit 30 which communicates with a cavity 32 milled into the face of the base plate 12, for purposes described hereafter. However, as noted hereafter, the cavities 32 will be in vacuum communication with vacuum chambers formed in the faces of the vacuum sizer die elements, so as to establish vacuum domains within the apparatus.

Each of the vacuum sizer die elements has a passageway which is shown generally at 34; a typical complicated passageway for atypical complicated extruded profile is shown in FIG. 3, and is discussed hereafter. Obviously, as discussed hereafter, the passageway 34 will be in the shape of an extruded plastic profile which is to be cooled and sized by being advanced in a longitudinal direction though the vacuum sizer box 10. The direction of advancement may be considered to be from left to right in the apparatus as shown in FIG. 1, and from right to left in the apparatus as it is shown in FIG. 2.

Figure 2:
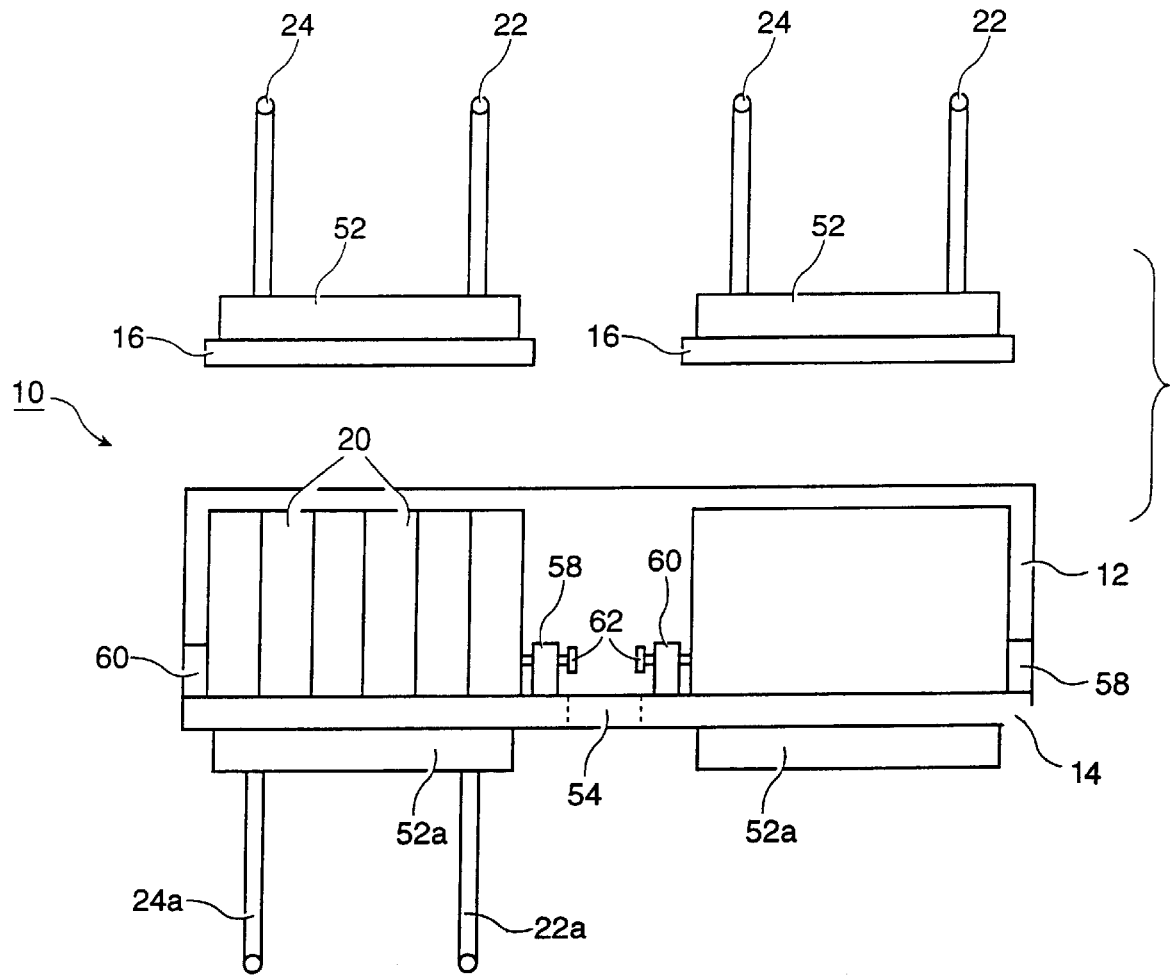
FIG. 2 is a top view of apparatus in keeping with the present invention in a partially assembled and partially disassembled condition.

There are, as noted, a plurality of vacuum sizer die elements 20, and they are arranged sequentially in at least one group such as shown in each of FIGS. 1 and 2. Typically, but not necessarily, there will be two groups of die elements arranged in a vacuum sizer box 10 in keeping with the present invention. The first die element of any group of die elements is that which is closest to the end of the apparatus which faces the extrusion die, when the vacuum sizer box 10 is in its operative position. In other words, the first die element is the left-most element in the group of die elements shown in FIG. 1, and the right-most vacuum sizer die element in the group of die elements shown in FIG. 2.

Obviously, when the die elements 20 are placed into position, the respective passageways 34 of contiguous die elements 20 are aligned with one another.

While it is possible that one or more water passages 26 may be formed in any of the base plate 12, first side plate 14, or top plate 18, typically the water passages 26 are formed in the side plate or side plates 16. Two side plates 16 are shown in FIG. 2, and it will be understood that each has a water passageway 26, or more than one water passageway 26, formed therein, as described in greater detail hereafter.

Referring briefly to FIGS. 3 and 6, for the moment, typical vacuum sizer die elements 20 and 120 are shown. Quite complicated extruded vinyl profiles 90 and 94 are shown in place in the vacuum sizer die elements 20 and 120 of FIG. 3 and FIG. 6, respectively, and further discussion of those profiles and the respective vacuum sizer die elements will follow hereafter.

Having regard to FIG. 3, it will be noted that there are a plurality of vacuum passages 36 which extend through the thickness of each vacuum sizer die element 20; and at least one slit 38 extends from each one of the vacuum passages 36 to the outer periphery of the passageway—which, as noted, is defined by the outer surfaces of the extruded profile 90. It can thus be seen that each vacuum passage 36 and each vacuum slit 38 thereby provides for vacuum communication from the passageway 34 to the plurality of vacuum passages 36, and provides for a vacuum domains to be set up at the periphery of the passageway 34 wherever the slits 38 extend to the passageway.

Each of the vacuum passages 36 is in vacuum communication with a vacuum chamber 40 or 42. The vacuum chamber or chambers 40, 42 are formed in at least one face 21 of at least one vacuum sizer die element 20 in at least each group of vacuum sizer die elements. That face 21 must contact a face of a contiguous vacuum sizer die element, for the reasons described immediately below.

It will be recalled that there is a cavity or plurality of cavities 32 which are formed in the base plate 12, and which are in vacuum communication with vacuum conduits 28. A further cavity or chamber 37 may be formed in the face of a vacuum sizer die element 20, which will overlie a respective mating cavity 32. Thus, a vacuum chamber or series of vacuum chambers 40, 42 and connecting channels 44 therefor, will establish a vacuum chamber 37, 40, 44, 42, provided that there is either a mirrored and mating face on a contiguous die element 20 or a blank face on a contiguous die element 20. The vacuum chamber 33, 37, 40, 44, 42 defines or contains a vacuum with respect to the atmosphere when a vacuum pump to which it is connected through vacuum conduit 28 is operating. Thus, it will be seen that a vacuum will be drawn through each of the vacuum passages 36, and in each of the slits 38, and therefore vacuum domains will be set up at a plurality of locations in the passageway 34, defined at the end of each slit 38.

Returning again to FIG. 1, it will be noted that the base plate 12 and the first side plate 14 are permanently connected one to the other so as to provide a pair of reference planes 13, 15—which are the upper and inner surfaces of the base plate 12 and first side plate 14, respectively. The assembly of the base plate 12 and the first side plate 14 is, as noted, a permanent assembly; moreover, the assembly is such that the reference planes 13, 15 are perpendicular to each other.

Figure 4:
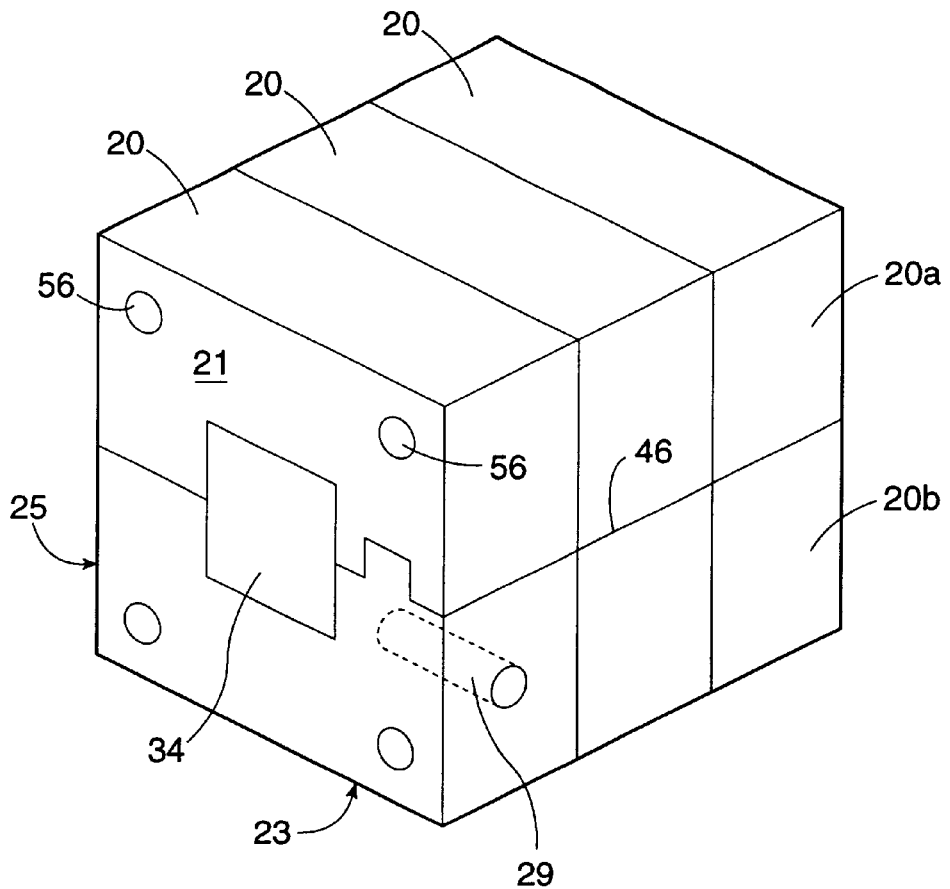
FIG. 4 is a simplified sketch showing a mode of assembly of a group of vacuum sizer die elements in keeping with the present invention.

Each vacuum sizer element 20 (or 120) is formed having two of its sides, shown at 23 and 25 in each of FIGS. 3 and 4, as well as two other sides so as to form a rectangular (or square) periphery for each vacuum sizer die element 20. Each vacuum sizer die element 20 is also, of course, formed with a front face 21 and a back face, each of which is perpendicular to the longitudinal direction or axis of the vacuum sizer box 10. Thus, each vacuum sizer die element 20 has a uniform thickness from to back—from front face 21 to the rear face thereof.

The two sides 23 and 25 of each of the vacuum sizer die elements 20 are formed so as to be perpendicular to each other, and are precisely machined for that perpendicularity and so as to be reference sides of each respective die element. Obviously, therefore, the reference sides 23 and 25 of each of the die elements 20 fit against the reference planes 13 and 15, respectively, defined by the base plate 12 and first side plate 14 of the vacuum sizer box 10.

The passageway 34 which is formed in each of the plurality of vacuum sizer die elements 20 is placed in a very precise relationship with respect to the reference sides 23, 25 of each respective vacuum sizer die element. Thus, when each vacuum sizer die element 20 is placed in its position, so that its reference sides 23, 25 face the reference planes 13, 15, the placement of the passageway 34 is precisely known, and there is therefore no necessity for alignment of the passageways of the respective vacuum sizer die elements 20 when they are put into place.

Such an arrangement manifests many advantages. The first advantage is that each vacuum sizer die element can be relatively thin from front face 21 to the back face—typically, a thickness of 5 centimetres or 6 centimetres is appropriate. That means that the cost of machining or cutting the die element may be significantly lowered. The cost of minor adjustments to the die elements during their proving and acceptance set-up may be lessened, and may be less expensive. Minute adjustments or changes from one vacuum sizer die element to the next may be made, in terms of the precise overall external dimensions of the cavity 34 in each respective vacuum sizer die element 20, so as to provide for a more controlled cooling and sizing or calibrating of the plastic extrusion as it passes through the vacuum sizer box of the present invention.

Accordingly, the present inventor has quite unexpectedly found that, not only is the question of alignment and re-alignment of vacuum sizer die elements obviated as a consequence of the present invention, a better control of the vacuum calibration and cooling of the plastic extrusion as it passes through the vacuum sizer box may be exercised, resulting in a higher throughput with less down time.

Typically, the vacuum sizer die elements—and, indeed, the base plate, side plates, and top plate, as well—of the vacuum sizer box in keeping with the present invention, are machined from aluminum. Typically, the machining is carried out using EDM (Electronic Discharge Machine) equipment, in which the precise movement of a brass wire passed through the thickness of a block of aluminum to be machined, is computer controlled. Indeed, such equipment more easily—but not exclusively—allows for the precise relationship of the respective reference sides of each respective vacuum sizer die element to the passageway which is formed therein, so that when the precisely machines reference sides of each respective vacuum sizer die element are placed against the reference planes provided by the base and first side plates of the vacuum sizer box, the vacuum sizer die elements will be precisely placed without the necessity for further alignment, as noted above.

Typically, the size of the passageway in the first vacuum sizer die element in a group of like elements will differ slightly from the passageway and other elements, and the outer dimensions of the respective passageways of contiguous die elements may be reduced from the first die element in that group of die elements to the last vacuum sizer die element in that group of die elements.

Also, the outer dimensions of the respective passageways of one or more of the vacuum sizer die elements in any group thereof may be progressively diminished from the front face 21 to the rear face of each such vacuum sizer die element 20.

Typically, each of the vacuum sizer die elements 20 is split into upper and lower sections 20a and 20b, respectively, as shown particularly in FIGS. 3 and 4—or 120a and 120b as shown in FIG. 6—at a split line 46. Obviously, when the upper and lower sections 20a and 20b of each respective vacuum sizer die element 20 are assembled together, the passageway 34 will be defined. There are several reasons for splitting the vacuum sizer die elements 20, not the least of which is that if it is required that they be cleaned, it is easier to do so. Moreover, assembly of the vacuum sizer die elements is more easily accomplished by placing the lower section 20b against the reference planes 13, 15 first, and then assembling the upper section 20a to the lower section, with the face 25 thereof being placed against the reference plane 15. The assembly of the upper and lower sections 20a, 20b may be expedited by the use of keys 48 placed in suitable key-ways 50.

Also with reference to FIG. 3, it will be noted that the external surfaces of the extruded profile 90, as indicated in various places at 70, will define the outer dimensions of the passageway 34, except in the region designated at 72. There, it will be seen that there is an element 92 which may be a soft vinyl element which is intended for use as a sweep or a seal, for example, when the extruded profile 90 is put into its intended use. However, the soft vinyl profile 92, which is co-extruded with the extruded profile 90, is not one which can be vacuum sized, nor does it need to be vacuum sized. Therefore, a small chamber defined at 72, extending in the longitudinal direction from the extrusion die—the direction in which the extruded profile 90 is extruded—is provided in the vacuum sizer die element 20.

Turning now particularly to FIG. 6, an alternative vacuum sizer die element 120, having upper and lower sections 120a and 120b, is shown. Here, the assembly of the upper section 120a to the lower section 120b is easily accommodated by mating tongue and groove arrangements 74, 75. A number of similarities will be found between the vacuum sizer die element 120 and the vacuum sizer die element 20 of FIGS. 6 and 3, respectively, and thus there is no necessity for discussion of the common elements and similarities between them.

The embodiment of the vacuum sizer die element 120 of FIG. 6 differs particularly in the manner in which vacuum is distributed from the vacuum chamber 37 which communicates with the cavities 32 formed in the base plate 12, to the surfaces of the extruded profile 94 which are intended to be exposed to the vacuum for vacuum sizing purposes.

To that end, galleries 76, 78, 80 are formed in the front face 21 of the vacuum sizer die element 120. Just as with the vacuum chambers 37, 40, 44, 42, as discussed above, the depth of the chamber 37 and galleries 76, 78, 80, from the front face 21 of the vacuum sizer die element 120 will typically be 2 millimetres or 3 millimetres.

However, instead of exposing surfaces or portions of surfaces of the extruded profile 94 to vacuum which is communicated to those surfaces through slits which are parallel to the longitudinal direction of the passageway 34 formed through the vacuum sizer die element 20, vacuum is applied to selected portions of the extruded profile 94 in vacuum domains which are established perpendicular to the longitudinal direction of the passageway 34. Thus, several regions 82, 84, 86, 88 are milled into the front face 21 of the vacuum sizer die element 120 and extend to the passageway 34 so as to establish vacuum domains in various regions of the outer surfaces of the extruded profile 94 being passed through the vacuum sizer die element 120.

It will be noted that galleries 78 and 80 communicate with each other across the split line 46.

Thus, apart from the fact that the vacuum domains are established cross-wise of the surfaces of the extruded profile 94 in the vacuum sizer die element 120 of FIG. 6, as opposed to longitudinally of the extruded profile 90, as described above with reference to FIG. 3, the vacuum sizer die elements 20 and 120 are identical as to their function and as to their mode of operation. Thus, the discussions herein with respect to FIGS. 3 and 6 apply equally to each other as appropriate, particularly as it relates to the assembly of the vacuum sizer die elements into a vacuum sizer box, as described elsewhere herein.

However, for purposes of clarity, and for purposes of claim construction of the claims appended hereto, it will be understood that the term vacuum slot is meant to be inclusive of the slits 38 and the milled areas 82, 84, 86, and 88, all as described above. Moreover, the terms vacuum chamber and vacuum gallery may be used interchangeably throughout the present disclosure and the appended claims.

A typical arrangement of a vacuum sizer box in keeping with the present invention is for there to be two groups of vacuum sizer die elements 20, as suggested in each of FIGS. 1 and 2. Accordingly, there are two second side plates 16 which are provided, also as shown in FIG. 2. Moreover, in that event, there will typically be at least one water passage 26 formed in each of the side plates 16.

However, the water passage which is formed in each of the side plates 16 may be defined by a groove which is cut into the outer surface 17 of each second side plate 16, which groove is then covered by a cover plate 52, as shown in FIG. 2. Obviously, the cover plates 52 are placed against the respective outer surfaces 17 of the respective second side plates 16, and are connected thereto by suitable means such as bolting and the placement of a gasket between the second side plate 16 and the cover plate 52.

It is also shown in FIG. 2 that an alternative placement, or an additional placement, of water passages 26 may be in the first side plate 14, by the use of cover plates 52a together with appropriate water conduits 22a, 24a.

It is further shown in FIGS. 1 and 2 that there may be an opening 54 which is formed in the first side plate 14. That opening provides for an inspection portal, whereby the general status of the extruded profile as it is passing through the vacuum sizer box 10 may be examined by looking into the opening 54. Obviously, in that case, there will be two groups of vacuum sizer die element 20, one of which is placed at each side of the opening 54.

Moreover, by spacing two groups of vacuum sizer die elements 20 on each side of the opening 54, a thermal break is provided between the two groups of die elements. That means that there may be more efficient cooling of the extruded profile as it passes through the vacuum sizer block, because there will be less heat which is passed from the last vacuum sizer die element in the first group to the first vacuum sizer die element in the second group, than if they were placed contiguously to each other. Thus, more efficient cooling may be effected.

Typically, the vacuum sizer die elements in each group thereof are clamped together, when in place in the vacuum sizer box 10. That clamping arrangement of the vacuum sizer die elements may be effected in several different manners. For example, as suggested in FIG. 4, an assembly of a group of vacuum sizer die elements 20 may be effected by passing a plurality of bolts 56 through respective bolt holes (not shown) formed in each of the vacuum sizer die elements 20.

Alternatively, as shown in FIGS. 1 and 2, a pair of setting blocks 58, 60 may be secured to at least one of the base plate 12 and first side plate 14 so that, when the group of vacuum sizer die elements 20 is placed between them, then a set screw 62 in one or the other of the pairs of setting blocks 58, 60 may be advanced against the endmost vacuum sizer die element 20 in that group which is next to the set screw 62, so as to urge the group of vacuum sizer die elements 20 into a clamped together relationship.

Obviously, there can be a plurality of vacuum pumps in vacuum communication with a plurality of vacuum chambers 33, 37, 40, 42 within the vacuum sizer box. Thus, the vacuum pressure existing in the respective vacuum domains throughout the apparatus which is defined by the respective vacuum chambers 37, 40, 42 in various ones of the vacuum sizer die elements 20 may be varied from one vacuum domain to another in differing vacuum sizer die elements, as a consequence of different vacuum pressures being exerted by the respective different ones of the plurality of vacuum pumps. Accordingly, close control over the vacuum sizing of the extruded profile as it passes through the vacuum sizer box 10 may be exercised.

Of course, as noted, there is no necessity to disconnect the vacuum sizer box 10 from the vacuum pump or pumps, or from the source of cooling water, as one group or set of groups of vacuum sizer die elements 20 may be removed from the vacuum sizer box and another group installed in its place. The same conditions would, of course, apply in the necessity to open the vacuum sizer box for cleaning of the vacuum sizer die elements in the event of unexpected stoppage of the extruder line.

Figure 5:
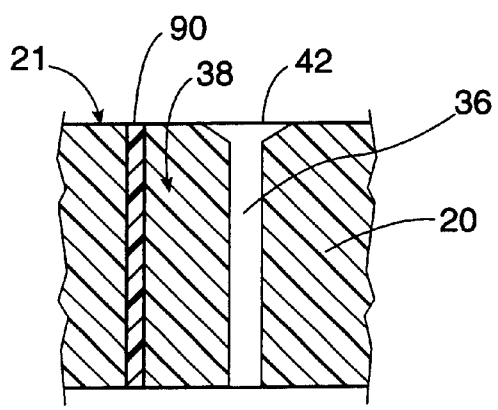
FIG. 5 is a partial cross-section taken in the direction of arrows 5—5 in FIG. 3.

Referring briefly to FIG. 5, a cross-section of a vacuum sizer die element 20 is shown, as designated by the lines 5—5 in FIG. 3. The vacuum chamber 42 is shown as being formed in the face 21 of the vacuum sizer die element 20, with the vacuum passage 36 passing through its thickness and communicating with the slit 38 which is shown in the region between the vacuum passage 36 and the extruded profile 90.

Obviously, by appropriate placement and machining of the faces of respective vacuum sizer die elements 20, vacuum domains of at least two vacuum sizer die elements can be in vacuum communication with a single vacuum chamber, or at least a single vacuum cavity 32.

The assembly of a vacuum sizer box in keeping with the present invention is easily accommodated. Typically, a tongue and groove fitment 64, 66 can be provided between the base plate 12 and the one or more second side plates 16. Moreover, a further pair of tongue and groove fitment arrangements 68, 70 and 72, 74 may be provided between the top plate 18 and the second side plate or plates 16. The arrangement shown in FIG. 1 is handed, so that the top plate 18 will only fit to the vacuum sizer box in one way or manner.

Typically, the connection of the vacuum conduits 28, as well as the water inlet and outlet conduits 22, 24, is to the second side plate or plates 16. However, the vacuum conduits 28 may be arranged directly to the base plate 12, as suggested as well in FIG. 1, at 28.

It is also suggested in FIG. 4 that an alternative vacuum passage 29 might be placed in each of the vacuum sizer die elements 20.

Because there is no cooling water or other coolant in the region of the interior of the vacuum sizer box 10, and because the respective mating faces of the vacuum sizer die elements 20 to the reference plane 13 with the vacuum cavities 32 formed therein are accomplished at relatively highly machined surfaces, which may be slightly oiled in any event, there is no necessity for the provision of vacuum gaskets anywhere in the vacuum sizer box 10 of the present invention.

Moreover, as noted, there is no necessity for the disassembly of the vacuum conduits 28 or water conduits 22, 24 in the event that the vacuum sizer box 10 is opened for any reason.

Finally, as noted, one reason for opening the vacuum sizer box 10 of the present invention is to replace one group of vacuum sizer die elements 20, or sets of groups of vacuum sizer die elements 20, with different groups having different passageways in the shape of different respective extruded plastic profiles formed therein.

Thus, differing groups of vacuum sizer die elements having different passageways in the shape of different respective extruded plastic profiles may be placed into the vacuum sizer box of the present invention, simply by fitment of the respective reference sides 23, 25 of each respective group of vacuum sizer die elements 20 to the reference planes 13, 15, followed by assembly of the second side plate or plates 16, and the top plate 18, thereto.

Accordingly, the present invention has provided a modular apparatus which comprises a plurality of vacuum sizer die elements, where groups of vacuum sizer die elements having differing extruded profile passageways therethrough, may be changed with a minimum of effort and in a minimum amount of time.

It has been discussed above that the cooling and sizing of an extruded plastic profile using the apparatus of the present invention may be closely and economically controlled. Moreover, it is clear that the cost of production of vacuum sizer boxes in keeping with the present invention may be reduced, thus resulting in the savings of production costs for the extruded plastic profile which will be calibrated in a vacuum sizer box of the present invention as it is being manufactured.

As noted, assembly and disassembly of a vacuum sizer box in keeping with the present invention does not require connecting and/or disconnecting either vacuum or cooling water lines or conduits which are connected to the vacuum sizer box when it is in its assembled condition.

Other modifications and alterations may be used in the design and manufacture of the apparatus of the present invention without departing from the spirit and scope of the accompanying claims.

Throughout this specification and the claims which follow, unless the context requires otherwise, the word "comprise", and variations such as "comprises" or "comprising", will be understood to imply the inclusion of a stated integer or step or group of integers or steps but not to the exclusion of any other integer or step or group of integers or steps.

What is claimed is:

1. Apparatus for cooling and sizing an extruded plastic profile as the extruded plastic profile is advanced forwardly in a longitudinal direction from an extrusion die therefor;

wherein said apparatus is connected to a source of cooling water and includes at least one water passage for the flow of cooling water therethrough;

wherein said apparatus is connected to at least one vacuum pump, and includes vacuum passages and vacuum chambers within said apparatus so that vacuum domains are set up within said apparatus;

said apparatus comprising:

a base plate, a first side plate, at least one second side plate, a top plate, and a plurality of vacuum sizer die elements;

each of said plurality of vacuum sizer die elements having a passageway therethrough, which is in the shape of an extruded plastic profile to be cooled and sized by being advanced in a longitudinal direction through said apparatus;

said plurality of vacuum sizer die elements being arranged sequentially in at least one group thereof, with the first die element in any group of die elements being the die element in that group of die elements which is closest to the end of said apparatus which faces an extrusion die when in its operative position; wherein the respective passageways of contiguous die elements are aligned one with another;

at least one water passage being formed in at least one of said base plate, first side plate, at least one second side plate, and said top plate;

at least one vacuum chamber being formed in at least one face of at least one vacuum sizer die element in said at least one group thereof, which at least one face contacts a face of a contiguous vacuum sizer die element;

at least one vacuum slot extended from said at least one vacuum chamber to the outer periphery of said passageway so as to provide vacuum communication from said passageway to said at least one vacuum chamber;

said at least one vacuum chamber being in vacuum communication through a respective passage formed in said base plate with said at least one vacuum pump;

said base plate and first side plate being permanently connected one to the other so as to provide a pair of reference planes defined thereby; wherein said pair of reference planes are perpendicular to each other;

each of said vacuum sizer die elements being formed with two faces which are perpendicular to said longitudinal direction, and four sides forming a rectangular periphery thereof;

wherein two of said four sides of each of said vacuum sizer die elements, which are perpendicular to each other, are precisely machined so as to be reference sides of each respective die element, and said reference sides of said plurality of vacuum sizer die elements fit to said reference planes defined by said base plate and said first side plate; and wherein said passageway formed in each of said plurality of vacuum sizer die elements is placed with a precise relationship to the respective reference sides of each respective vacuum sizer die element.

2. The apparatus of claim 1, wherein the outer dimensions of the respective passageways of contiguous die elements are reduced from the first die element in any group of die elements to the last die element in that group of die elements.

3. The apparatus of claim 1, wherein the outer dimensions of the respective passageways of at least more than one of said plurality of vacuum sizer die elements are progressively diminished from one face to the other of each of the respective vacuum sizer die elements.

4. The apparatus of claim 1, wherein each of said plurality of vacuum sizer die elements is split into upper and lower sections thereof; and wherein said upper and lower sections of each of said plurality of vacuum sizer die elements are assembled together so as to define said passageway therebetween.

5. The apparatus of claim 4, wherein there are two groups of vacuum sizer die elements assembled in said apparatus; and wherein there are two second side plates, one for each of said two groups of vacuum sizer die elements.

6. The apparatus of claim 5, wherein there is at least one water passage formed in each of said two second side plates.

7. The apparatus of claim 5, wherein there is at least one water passage formed in each of said two second side plates by a groove cut into the outer surface of each of said second side plates, and a cover plate placed against the respective outer surface of each said second side plates and connected thereto.

8. The apparatus of claim 5, wherein an opening is formed in said first side plate, and wherein said two groups of vacuum sizer die elements are placed in said apparatus so as to be positioned on each side of said opening.

9. The apparatus of claim 1, wherein the vacuum sizer die elements in said at least one group thereof are clamped together.

10. The apparatus of claim 9, wherein the vacuum sizer die elements in said at least one group thereof are clamped together by a plurality of bolts extending through respective bolt holes formed in each of said vacuum sizer die elements.

11. The apparatus of claim 9, wherein the vacuum sizer die elements in said at least one group thereof are clamped together by being placed between a pair of setting blocks secured to at least one of said base plate and said first side plate, and wherein at least one set screw extends through one of said setting blocks so as to be advanced against the endmost vacuum sizer die element in said group, and so as to urge said group of vacuum sizer die elements into a clamped together relationship.

12. The apparatus of claim 1, wherein there is a vacuum slot formed in at least one face of at least one vacuum sizer die element in said at least one group thereof so as to provide vacuum communication from said passageway to said at least one vacuum chamber formed in said at least one face.

13. The apparatus of claim 1, wherein a plurality of vacuum passages extend through each one of said vacuum sizer die elements, and at least on slit extends from each of said vacuum passages to the outer periphery of said passageway so as to provide vacuum communication from said passageway to said plurality of vacuum passages.

14. The apparatus of claim 1, wherein there are a plurality of vacuum pumps in vacuum communication with a plurality of vacuum chambers within said apparatus, whereby the vacuum pressure existing in the respective vacuum domains throughout said apparatus defined by the respective vacuum chambers with which they are in vacuum communication are varied from one vacuum domain to another as a consequence of different vacuum pressures being exerted by respective different ones of said plurality of vacuum pumps.

15. The apparatus of claim 1, wherein at least one vacuum chamber is formed in each respective vacuum sizer die element in each group thereof.

16. The apparatus of claim 1, wherein vacuum domains of at least two vacuum sizer die elements are in vacuum communication with a single vacuum chamber.

17. The apparatus of claim 1, wherein there is a tongue and groove fitment between said base plate and said at least one second side plate.

18. The apparatus of claim 1, wherein there is a tongue and groove fitment between said top plate and each of said first side plate and said at least one second side plate.

19. The apparatus of claim 1, wherein each of said base plate, first side plate, at least one second side plate, top plate, and plurality of vacuum sizer die elements is machined from aluminum.

20. The apparatus of claim 1, wherein differing groups of vacuum sizer die elements, having different passageways in the shape of different respective extruded plastic profiles, are selectively placed into said apparatus by fitment of the respective reference sides of each respective group of vacuum sizer die elements to said reference planes, and subsequent assembly of said at least one second side plate and said top plate thereto.

21. Apparatus for cooling and sizing an extruded plastic profile as the extruded plastic profile is advanced forwardly in a longitudinal direction from an extrusion die therefor;

wherein said apparatus is connected to a source of cooling water and includes at least one water passage for the flow of cooling water therethrough;

wherein said apparatus is connected to at least one vacuum pump, and includes vacuum passages and vacuum chambers within said apparatus so that vacuum domains may be set up within said apparatus;

said apparatus comprising:

a base plate, a first side plate, at least one second side plate, a top plate, and a plurality of vacuum sizer die elements;

each of said plurality of vacuum sizer die elements having a passageway therethrough, which is in the shape of an extruded plastic profile to be cooled and sized by being advanced in a longitudinal direction through said apparatus;

said plurality of vacuum sizer die elements being arranged sequentially in at least one group thereof, with the first die element in any group of die elements being the die element in that group of die elements which is closest to the end of said apparatus which faces an extrusion die when in its operative position; wherein the respective passageways of contiguous die elements are aligned one with another;

at least one water passage being formed in at least one of said base plate, first side plate, at least one second side plate, and said top plate;

at least one vacuum chamber being formed in at least one face of at least one vacuum sizer die element in said at least one group thereof, which at least one face contacts a face of a contiguous vacuum sizer die element;

at least one vacuum slot extended from said at least one vacuum chamber to the outer periphery of said passageway so as to provide vacuum communication from said passageway to said at least one vacuum chamber;

said at least one vacuum chamber being in vacuum communication through a respective passage formed in said base plate with said at least one vacuum pump;

said base plate and first side plate being permanently connected one to the other so as to provide a pair of reference planes defined thereby; wherein said pair of reference planes are perpendicular to each other;

each of said vacuum sizer die elements being formed with two faces which are perpendicular to said longitudinal direction, and four sides forming a rectangular periphery thereof;

wherein two of said four sides of each of said vacuum sizer die elements, which are perpendicular to each other, are precisely machined so as to be reference sides of each respective die element, and said reference sides of said plurality of vacuum sizer die elements fit to said reference planes defined by said base plate and said first side plate;

wherein said passageway formed in each of said plurality of vacuum sizer die elements is placed with a precise relationship to the respective reference sides of each respective vacuum sizer die element;

wherein each of said plurality of vacuum sizer die elements is split into upper and lower sections thereof; and wherein said upper and lower sections of each of said plurality of vacuum sizer die elements are assembled together so as to define said passageway therebetween;

wherein there are two groups of vacuum sizer die elements assembled in said apparatus; and wherein there are two second side plates, one for each of said two groups of vacuum sizer die elements;

wherein an opening is formed in said first side plate, and wherein said two groups of vacuum sizer die elements are placed in said apparatus so as to be positioned on each side of said opening; and wherein a thermal break between said two groups of vacuum sizer die elements exists in the region of said opening of said first side plate.

* * * * *